United States Patent [19]

Hong

[11] Patent Number: 5,718,961
[45] Date of Patent: Feb. 17, 1998

[54] PHASE CHANGE TYPE OPTICAL DISK

[75] Inventor: Hyeon-chang Hong, Ansan, Rep. of Korea

[73] Assignee: Samsung Electronics Co., Ltd., Suwon, Rep. of Korea

[21] Appl. No.: 730,671

[22] Filed: Oct. 11, 1996

[30] Foreign Application Priority Data

Oct. 31, 1995 [KR] Rep. of Korea .................. 95-39024

[51] Int. Cl.$^6$ .................................................. B32B 3/00
[52] U.S. Cl. .................. 428/64.1; 428/64.2; 428/64.4; 428/64.5; 428/64.6; 428/457; 428/913; 430/270.12; 430/270.13; 430/495.1; 430/945; 369/283; 369/288
[58] Field of Search .................... 428/64.1, 64.2, 428/64.4, 64.5, 64.6, 457, 713; 430/270.12, 270.13, 495.1, 945; 369/283, 288

[56] References Cited

U.S. PATENT DOCUMENTS

| 4,847,132 | 7/1989 | Takao et al. ................ 428/64 |
| 5,233,599 | 8/1993 | Ohno et al. ................ 369/288 |

OTHER PUBLICATIONS

S. Ohkubo et al., "Improvement in Jitter Characteristics in Mark Edge Recording for Phase Change Media," *Jpn. J. Appl. Phys.*, vol. 32 (1993), Part 1, No. 11B, Nov. 1993, pp. 5230–5233.

WPI Abstract Accession No. 93–260748/33 & JP 050174436 A (Sanyo) Jul. 13, 1993.

WPI Abstract Accession No. 87–332350/47 & JP 620239443 A (Seiko Epson) & Patent Abstracts of Japan, vol. 12, No. 107 (P–686), p. 164.

*Primary Examiner*—Elizabeth Evans
*Attorney, Agent, or Firm*—Burns, Doane, Swecker & Mathis, L.L.P.

[57] ABSTRACT

An optical recording medium is provided in which a first dielectric film, a second dielectric film, a recording film, a reflective film are sequentially stacked on a substrate, said first dielectric film and second dielectric film are formed of ZnO-BN. The optical disk has high recording sensitivity and high thermal stability.

9 Claims, 3 Drawing Sheets

5,718,961

PHASE CHANGE TYPE OPTICAL DISK

BACKGROUND OF THE INVENTION

The present invention relates to a phase change type optical disk, and more particularly to a phase change type optical disk which has high quality reproduced signals and high thermal stability by improving the dielectric layer.

Generally, rewritable optical recording media can be roughly classified into magnetooptical disks and phase change type optical disks. In a phase change type optical disk, a calcogenide based compound is used as the material of a recording film, which changes phases reversibly between a crystalline state and an amorphous state.

In a phase change type optical disk, recording and erasing of information is accomplished by phase changes of the recording film between a crystalline state and an amorphous state, and the information is reproduced by reading a crystalline state as 1(or 0) and an amorphous state as 0(or 1). That is, the information is recorded by changing the crystalline state of the recording film into an amorphous state by rapid cooling after heating over melting point, and the information is erased by changing the amorphous state into crystalline state by slow cooling after heating over crystalline temparature.

In a phase change type optical disk, recording and erasing of information is performed by direct, one-pass overwriting. That is, the recoding film changes into a crystalline state or an amorphous state according to the intensity of a laser beam regardless of its former state. Compared to the magnetooptical disk, the phase change type optical disk has advantages in that single beam overwriting can be easily achieved by rating the intensity of laser while magnetooptical overwriting involves two steps, erasing and recording of information.

Reproduction of information is performed by optically detecting differences in the reflectivities between the amorphous and crystalline states of the recording film and the phase change type optical disk has 15–30% difference in reflectivities between the two states, which is higher than that of magnetooptical disk whose differnce in reflectivities is about 2–3%.

Compared to the magnetooptical disk, the phase change type optical disk has a simply configuration because it does not need an outer magnetic field.

The general structure of a phase change type optical disk is shown in FIG. 1. In this structure, a first dielectric film 12, a recording film 13, a second dielectric film 14 and a reflecting film 15 are stacked on a transparent substrate 11 and the first and second dielectric films 13, 14 are both made of $ZnS-SiO_2$.

The main feature required for the first dielectric film 12 is to protect the recording film 13 from the heat of laser beams. When the dielectric film 12 is too thin, the recording film 13 is too close to the reflecting film 15, so that the heat diffusion effect becomes excessive, thereby resulting in deterioration of recording sensitivity. On the other hand, when the first dielectric film 12 is too thick, heat diffusion of the recording film to the reflecting film is reduced, thus distorting the shape of a recording mark.

The main feature required for the second dielectric film 14 is a thermal conductivity sufficiently large to transfer heat to the reflecting film 15 rapidly.

Generally, although $ZnS-SiO_2$ is used as the material of these dielectric films 12 and 14, it exhibits relatively poor recording sensitivity and thermal stability compared to magnetooptical disks.

SUMMARY OF THE INVENTION

To solve the above problems, it is an object of the present invention to provide a phase change disk in which distortion of a recording mark is minimized and high recording sensitivity and high thermal stability can be obtained.

To achieve the above object, there is provided a phase change disk in which a first dielectric film, a recording film, a second dielectric film, a reflective film are sequentially stacked on a substrate, wherein the first dielectric film and the second dielectric film are formed of ZnO-BN.

It is prefarable that the first dielectric film is formed of ZnO-h-BN(hexagonal) and the second dielectric film is formed of ZnO-c-BN(cubic).

It is also preferable that the mole ratio of B to N is 1:1 in the first and second dielectric films.

It is also preferable that the thickness of the first dielectric film is 50 Å to 500 Å and that of the second dielectric film is 50 Å to 300 Å.

When the first dielectric film has a thickness of less than 50 Å, the recording film is too close to the reflecting film, so that the heat diffusion effect becomes excessive, thereby resulting in deterioration of recording sensitivity. On the other hand, when the thickness of the first dielectric film exceeds 500 Å, heat diffusion of the recording film to the reflecting film is reduced, thus distorting the shape of the recording mark.

The second dielectric film is thinner than the first dielectric film since its purpose is to transfer heat to reflecting film.

In the phase change type optical disk of the present invention, the first and second dielectric films are improved, to thereby achieve excellent recording sensitivity and remarkable thermal stability.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
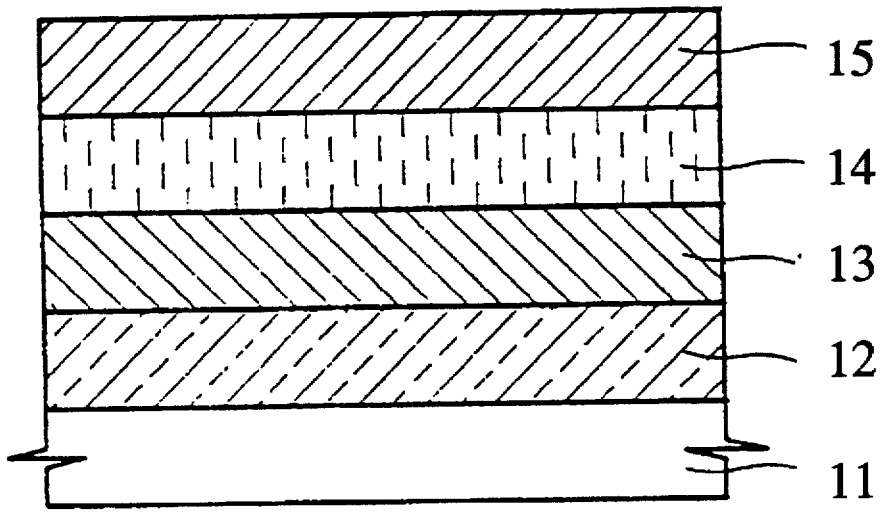
FIG. 1 is a sectional view illustrating the structure of a convevtional phase change type optical disk.
Figure 1A:
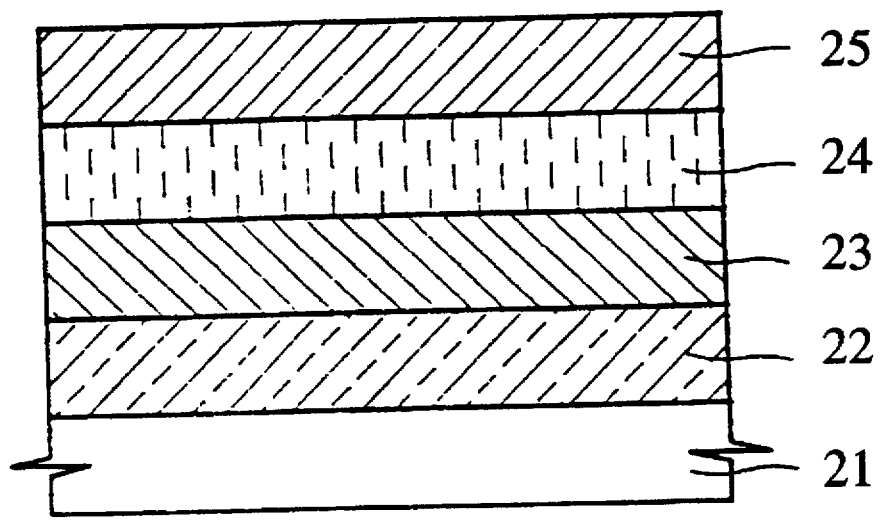
FIG. 1A is a sectional view illustrating the structure of a phase change type optical disk in accordance with the present invention.

FIG. 1 shows structure of the optical recording medium of the present invention. In FIG. 1, a first dielectric film 22, a recording film 23, a second dielectric film 24 and a reflecting film 25 are sequentially stacked on a substrate 21.

The substrate 21 may be made of PC, glass or any suitable optically transparent material, etc.

The recording film 23 may be made of calcogenide compound like GeSbTe in which a reversible change between an amorphous state and a crystalline state is possible. The thickness of the recording film 23 is above 100 Å.

The reflecting film 25 is made of at least one element selected from the group consisting of gold, aluminum, titanium, nickel and chromium and has a thickness of 100 Å to 1200 Å.

The first dielectric film 22 according to the present invention is made of ZnO-h-BN. It is preferable that the mole ratio of B to N is 1:1 in mole fraction. ZnO-h-BN (hexagonal) has a stable structure at ambient atmosphere and temperature and thus protects the substrate 21 and recording film 23 from thermal damage in recording/erasing. As a result, recording sensitivity can be improved.

The second dielectric film 24 is formed of ZnO-c-BN (cubic BN). It is preferable that the mole ratio of B to N is 1:1 in mole fraction. ZnO-c-BN (cubic BN) has a high thermal conductivity (1300 W/mK), to prevent thermal distortion during cooling and has high density so that refractivity is not diminished. As a result, the recording film 23 is protected from heat damage and has stable recording marks.

Features of h-BN and c-BN are shown in Table 1.

TABLE 1

| characteristic | h-BN | c-BN |
| --- | --- | --- |
| crystalline structure | hexagonal | cubic |
| density (g/cm³) | 2.3 | 3.5 |
| thermal conductivity (W/mk) | 50 | 1300 |
| refractive index | 1.8 | 2.1 | h-BN (hexagonal BN) has a stable structure at ambient atmosphere and temperature and thus protects the substrate 21 and the recording film 23 from thermal damage during recording/erasing. Therefore, the phase change type optical disk adopting ZnO-h-BN as a first dielectric film has improved recording sensitivity.

c-BN (cubic BN) has a high thermal conductivity (1300 W/mK) so that, when the laser beam is incident on the recording film 23, the heat is rapidly dissipated to the reflective layer 25. Therefore, the phase change type optical disk adopting ZnO-c-BN as a second dielectric film exhibits improved recording sensitivity and minimized thermal distortion of reproduced signals.

Hereinbelow, the present invention will be described in detail with reference to the following illustrative examples, but it is not limited thereto.

EXAMPLE 1

A phase change type optical disk(a) according to the present invention was prepared as follows. A first dielectric film (ZnO-h-BN), a recording film (GeSbTe), a second dielectric film (ZnO-c-BN) and a reflecting film (Al-Ti) were stacked in sequence on a polycarbonate substrate. The first dielectric film had a thickness of 300 Å and the second dielectric film had a thickness of 100 Å. Several properties of the optical disk(a) manufactured according to the present invention were measured and the results were shown in Tables 2-3 and FIGS. 2-5.

EXAMPLE 2

In this example, an optical disk(b) was prepared by the same method as described in example 1, except that the second dielectric film 24 had a thickness of 200 Å. Several properties of the prepared optical disk(b) were measured and the results were shown in Table 2 and FIGS. 2-4.

EXAMPLE 3

In this example, an optical disk(c) was prepared by the same method as in example 1, except that the second dielectric film 24 had a thickness of 250 Å. Several properties of the prepared optical disk(c) were measured and the results were shown in Table 2 and FIGS. 2-4.

EXAMPLE 4

In this example, an optical disk(d) was prepared by the same method as in example 1, except that the second dielectric film 24 had a thickness of 300 Å. Several properties of the prepared optical disk(d) were measured and the results were shown in Table 2 and FIGS. 2-4.

COMPARATIVE EXAMPLE 1

In this example, an optical disk(e) was prepared by the same method as described in example 1, except that each of the first and second dielectric films was made of ZnS(80%)–SiO$_2$(20%). Several properties of the prepared optical disk(e) were measured and the results were shown in Tables 2-3 and FIGS. 2-5.

COMPARATIVE EXAMPLE 2

In this example, an optical disk(f) was prepared by the same method as described in example 1, except that each of the first and second dielectric films was made of ZnS(80%)–SiO$_2$(20%) and each had a thickness of 200 Å. Several properties of the prepared optical disk(f) were measured and the results were shown in Table 2 and FIGS. 2-4.

COMPARATIVE EXAMPLE 3

In this example, an optical disk(g) was prepared by the same method as in example 1, except that each of the first and second dielectric films was made of ZnS(80%)–SiO$_2$(20%) and each had a thickness of 250 Å. Several properties of the prepared optical disk(g) were measured and the results were shown in Table 2 and FIGS. 2-4.

COMPARATIVE EXAMPLE 4

In this example, an optical disk(h) was prepared by the same method as in example 1, except that each of the first and second dielectric films was made of ZnS(80%)–SiO$_2$(20%) and each had a thickness of 300 Å. Several properties of the prepared optical disk(h) were measured and the results were shown in Table 2 and FIGS. 2-4.

COMPARATIVE EXAMPLE 5

In this example, an optical disk(i) was prepared by the same method as in example 1, except that each of the first and second dielectric films was made of ZnS(80%)–SiO$_2$(20%) and each had a thickness of 400 Å. Several properties of the prepared optical disk(i) were measured and the results were shown in Table 2 and FIGS. 2-4.

COMPARATIVE EXAMPLE 6

In this example, the optical disk(j) was prepared by the same method as in example 1, except that the second dielectric film 24 had a thickness of 400 Å. Several properties of the prepared optical disk(j) were measured and its results were shown in Table 2 and FIGS. 2-4.

Figure 2:
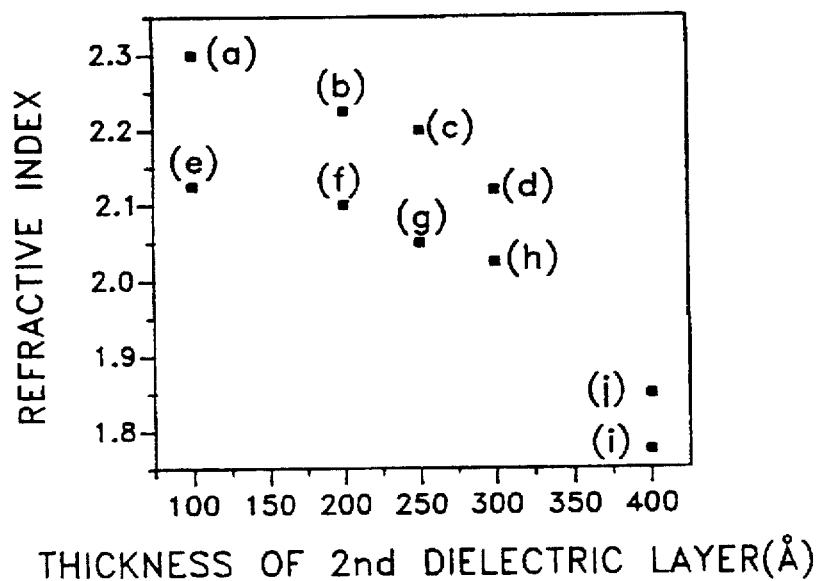
FIG. 2 is a graph illustrating refractive index according to the thickness of the second dielectric film.
Figure 3:
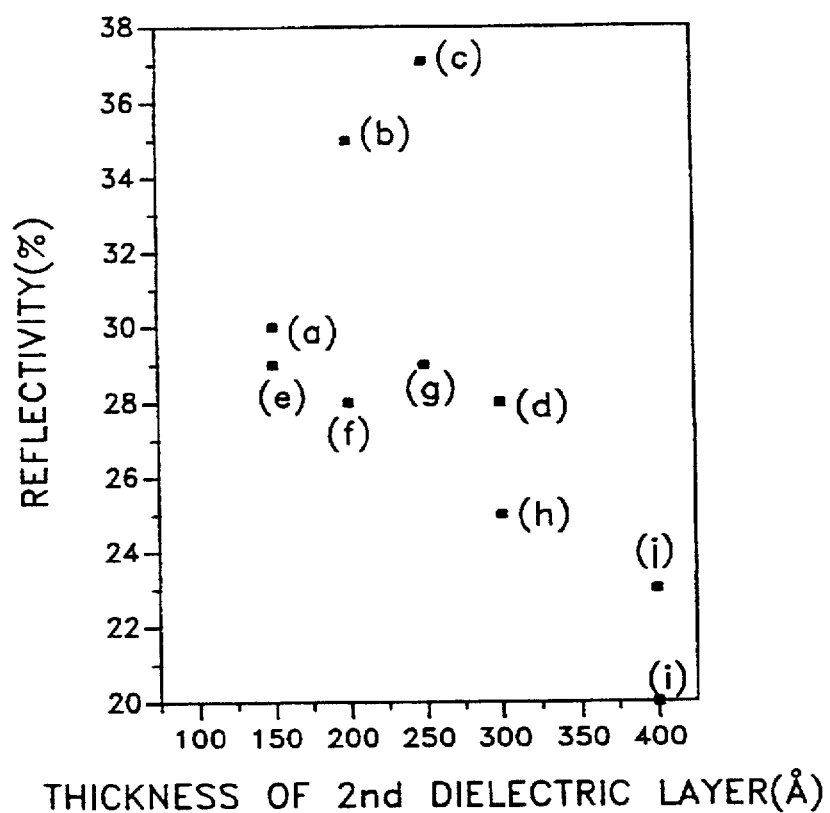
FIG. 3 is a graph illustrating reflectivity according to the thickness of the second dielectric film.
Figure 4:
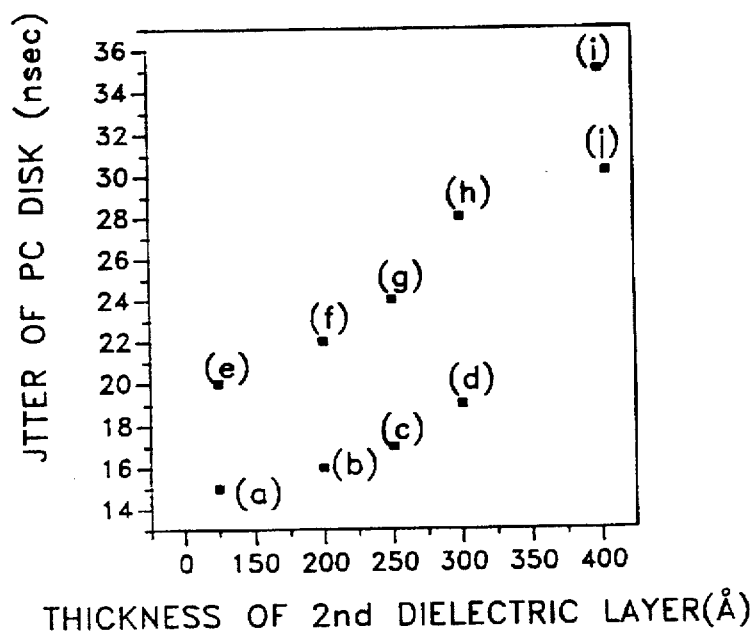
FIG. 4 is a graph illustrating jitter according to the thickness of the second dielectric film.

The properties measured on the above examples were refractive index, reflectivity, and jitter according to the thickness of the second dielectric film and the results are shown in Table 2 and FIGS. 2-4. In addition, the carrior-to noise according to write/read cycles of optical disk in example 1 and comparative example 1 is shown in Table 3 and FIG. 5.

TABLE 2

| example | refractive index | reflectivity (%) | jitter (ns) |
| --- | --- | --- | --- |
| example 1 (disk (a)) | 2.30 | 30 | 15 |
| example 2 (disk (b)) | 2.23 | 35 | 16 |
| example 3 (disk (c)) | 2.20 | 37 | 17 |
| example 4 (disk (d)) | 2.15 | 28 | 19 |
| comparative example 1 (disk (e)) | 2.13 | 27 | 20 |
| comparative example 2 (disk (f)) | 2.10 | 28 | 22 |
| comparative example 3 (disk (g)) | 2.05 | 29 | 24 |
| comparative example 4 (disk (h)) | 2.02 | 25 | 28 |
| comparative example 5 (disk (i)) | 1.78 | 20 | 35 |
| comparative example 6 (disk (j)) | 1.85 | 23 | 30 |

TABLE 3

| example | $10^1$ | $10^2$ | $10^3$ | $10^4$ |
| --- | --- | --- | --- | --- |
| example 1 (disk (a)) | 5 | 52 | 50 | 48 |
| comparative example 1 (disk (e)) | 53 | 50 | 47 | 45 |

As shown in Table 2 and FIGS. 2–4, the optical disk according to the present invention has higher refractivity and reflectivity and smaller jitter. Comparative example 6 shows poor refractivity, reflectivity and jitter because thickness is thicker than that of the present invention although the first and the second dielectric film were made of ZnO-h-BN and ZnO-c-BN according to the present invention.

Figure 5:
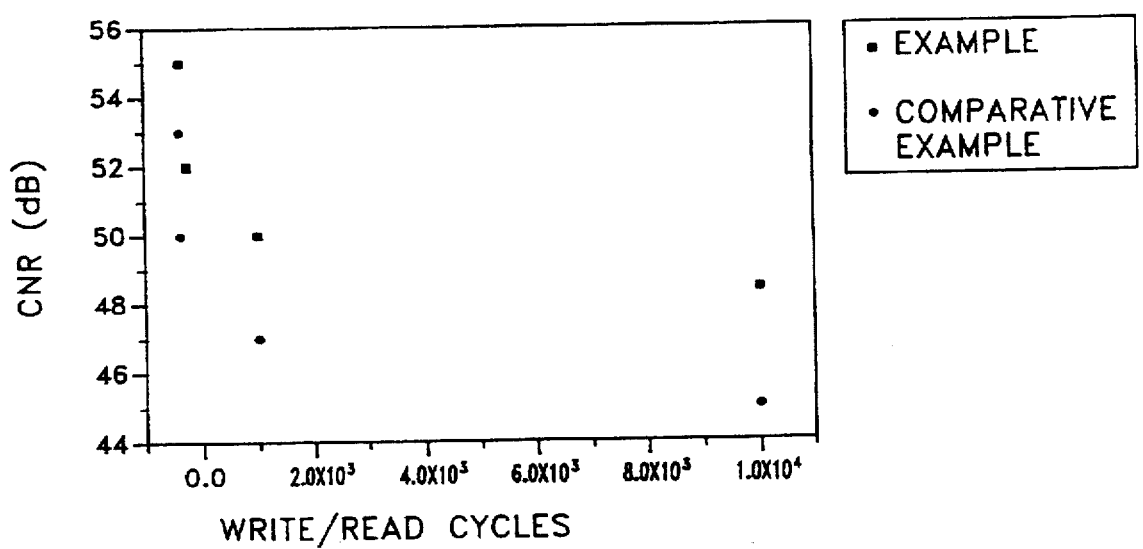
FIG. 5 is a graph illustrating carrier-to-noise ratio (CNR) according to write/read cycles.

In addition, as shown in Table 3 and FIG. 5, while the carrier-to-noise ratio of the optical disk of the prior art is diminished to 47 dB at $10^3$ cycles, that of the present invention is maintained at 50 dB and still 47 dB at $10^4$ cycles.

As known from the above, the phase change type optical disk according to the present invention has high recording sensitivity and high thermal stability by improving the dielectric film.

What is claimed is:

1. An optical recording medium comprising:

a first dielectric film having a thickness of 50–500 Å, a recording film, a second dielectric film having a thickness of 50–300 Å, a reflective film wherein said first dielectric film, recording film, second dielectric film, and reflective film are sequentially stacked on a substrate, wherein said first dielectric film and second dielectric film are formed of ZnO-BN.

2. An optical recording medium as claimed in claim 1, wherein said first dielectric film is formed of ZnO-h-BN (hexagonal).

3. An optical recording medium as claimed in claim 1, wherein said second dielectric film is formed of ZnO-c-BN (cubic).

4. An optical recording medium as claimed in claim 1, wherein said first dielectric film has a mole ratio of B to N of 1 to 1.

5. An optical recording medium as claimed in claim 1, wherein said second dielectric film has a mole ratio of B to N of 1 to 1.

6. An optical recording medium as claimed in claim 1, wherein said recording film is made of a calcogenide based compound material.

7. An optical recording medium as claimed in claim 1, wherein said reflective film is selected from the group consisting of gold, aluminum, titanium, nickel and chromium.

8. An optical recording medium as claimed in claim 1, wherein said recording film has a thickness above 100 Å.

9. An optical recording medium as claimed in claim 1, wherein said reflective film has a thickness of 100–1200 Å.

* * * * *